July 20, 1937.  C. D. FARMER  2,087,341
DEODORANT CONTAINER
Filed Dec. 11, 1933
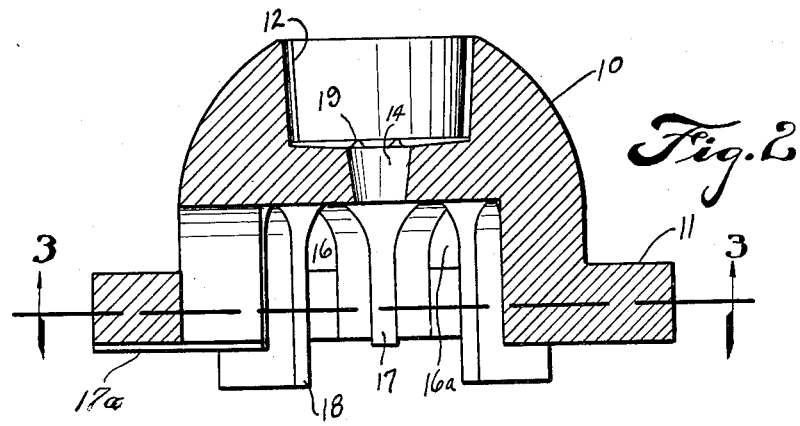
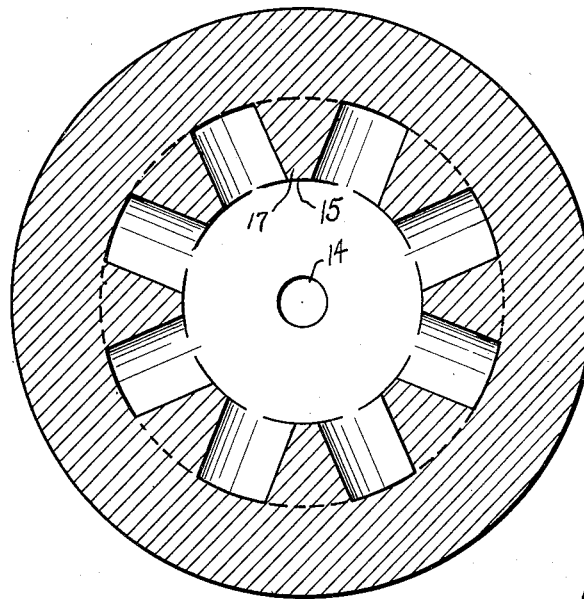
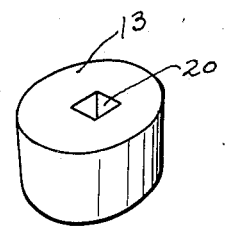
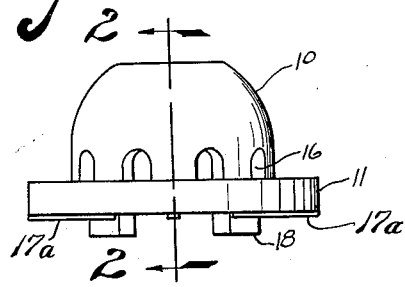
INVENTOR.
CHARLES D. FARMER
BY Joseph Farley
ATTORNEY.

Patented July 20, 1937

2,087,341

UNITED STATES PATENT OFFICE 2,087,341

DEODORANT CONTAINER

Charles D. Farmer, Detroit, Mich.

Application December 11, 1933, Serial No. 701,736

22 Claims. (Cl. 4—109)

This invention relates to deodorant containers for use in urinals, and has for its principal object to provide a combined contained and strainer of great efficiency but of simple and inexpensive construction. It has long been the practice to provide various deodorant devices for urinals, most of which, however, are of relatively expensive and complicated construction, and most of which, moreover, but poorly perform their intended function. One of the most efficient deodorants which has recently come into quite extensive use is the well-known germicidal and deodorant cake composed of paradi-chloro-benzine with formaldehyde. As heretofore employed, these cakes are usually placed in the urinal basin where they are subjected to the wash waters. The placing of the cake directly in the basin where they are located in the path of the flush water, is very wasteful because the cakes are soluble in water and are quickly dissolved.

One of the objects of the present invention is to provide a construction in which the deodorant cake may be supported above or out of the path of the flowing wash water, and in a position immediately above the drain pipe where it will perform its intended function most efficiently.

A further object is to provide, in combination with a holder for the deodorant cake, a strainer which will prevent solid substances from being washed down into the drain pipe and thereby clogging the same.

Another object is to so construct the strainer that while preventing the entrance of foreign solid bodies into the drain pipe, it will permit the ready passage of, not only the wash water, but seepage water into the drain pipe.

Other objects of the invention are to provide a strainer of neat and attractive appearance and to so construct the strainer that the manufacturing costs thereof are relatively low.

The above and other objects will appear more fully from the following, more detailed description, and by reference to the accompanying drawing wherein Fig. 1 is a side elevation of a combined strainer and deodorant container, constructed in accordance with the present invention.

Fig. 2 is an enlarged central sectional view, taken on the line 2—2 of Fig. 1.

Fig. 3 is a section on the line 3—3 of Fig. 2, and Fig. 4 is a perspective view of one of the deodorant cakes.

The container is preferably constructed of glazed porcelain having a dome shaped top portion 10 and a lower peripheral flange 11. The upper part of the dome 10 is provided with a central cylindrical recess 12 forming a deodorant cup or chamber with an opening in the top of dimensions suitable to allow the insertion of a unitary deodorant cake 13, such as shown in Fig. 4, which substantially fills the recess 12. The cylindrical recess 12 communicates through a central aperture 14 with an enlarged recess or cavity 15 formed in the bottom of the container. Communicating with the recess 15 is a plurality of radially extending spaced passageways 16, separated by the ribs or fingers 17, 18 which extend downwardly at spaced intervals along the periphery of dome 10. The ribs 17, as clearly shown in Fig. 2, project slightly below the base of the annular flange 11 and extensions thereof form elevating ribs 17a along the bottom of the flange 11 which elevating ribs serve to hold the strainer slightly above the surface upon which it may be supported and thereby to permit drain water to seep through below the container. The ribs 18 project downwardly considerably below the ribs 17, and in alternation therewith, for a purpose presently to be more fully described.

The bottom of the recess 12 has formed therein a plurality of small upwardly projecting ribs 19, which serve to hold the deodorant cake 13, slightly spaced above the bottom wall of the recess. The cake 13 is preferably made slightly smaller in diameter than the cylindrical recess 12, and this dimensioning of the cake, together with the ribs 19, permits seepage around the cake and also insures complete access of air all around the outer surface of the cake. It will be noted that the passages 16 extend to the bottom of the strainer and are open at the bottom, thereby insuring the absence of any lower horizontal surfaces that would collect sediment, each radial passage being open at the bottom thereof and communicating directly to the drain pipe, thus permitting an unobstructed passage of any solid particles small enough to pass through the passageway 16. It will also be noted that the outermost wall of each passageway 16 is in vertical alignment with the outer surface of the dome portion 10 and that each passageway extends vertically upward above the base flange 11 so as to form an aperture 16a immediately above the inner edge of the peripheral flange 11. Each of these apertures 16a has the same cross-sectional area as a one-half inch diameter pipe, which is the standard size for the flush water pipes for urinals, so that if all of the holes 16a but one are clogged, or stopped, there is still sufficient drainage capacity to prevent stoppage and overflow of the water. The construction of the radial ribs and passages 16 is such that the hole 16a in the side of the dome portion is formed, by the operation of a single die which forms the radial ribs and channels and the upper dome shaped portion 10 so as to form the holes 16a in the outer wall thereof.

The cake 13 is provided at its center with an aperture 20, which is located immediately above the aperture 14 and above the center of the waste or drain pipe.

The manner in which the device is installed and operates is as follows:

The strainers are made in different sizes for different installations. The usual strainer plate of the urinal having been removed, the container or strainer is placed directly over, and in axial alignment with the drain pipe, the flange 11 being made of such diameter as to fit neatly within the recess provided for the usual metallic strainer plate. If the plumber has happened to locate the outlet of the waste pipe too high, the lugs 18 fit down into the waste pipe and hold the strainer in proper alignment.

The deodorant cake 13 being placed within the upper cylindrical recess 12 will, if the strainer has been properly aligned above the waste pipe, be located immediately above the center of such waste pipe. The cake, being composed of the paradi-chloro-benzine, on exposure to the atmosphere releases chlorine gases which being of greater specific gravity than the air, flow down into the lower portion of the strainer immediately above the upper opening of the drain pipe and form a seal against the escape of ammonia fumes and objectionable odors from the waste pipe. The cake being supported considerably above the bottom of the urinal is held out of the path of the flush water and therefore will last a much greater length of time than if placed directly on the bottom of the urinal and subjected to the flow of the flush water. As the flange 11 extends above the bottom of the urinal it forms a barrier that prevents heavy articles from passing through or clogging the openings 16a and the drain pipe, while the ribs 17, 18 tend to prevent the passage of large floating material that might be carried by the wash water over the top of the flange 11. The bottom of the flange 11 being held slightly spaced above the supporting surface by the projection of the ribs 17, permits the water that does not flow over the top of the flange 11 to drain completely into the waste pipe.

While I have shown by way of illustration an embodiment of my invention that has worked highly satisfactorily in actual operation, it will be understood that many changes, variations and modifications may be resorted to without departing from the spirit of the invention.

I claim:

1. A deodorant device for drains, comprising a perforated body having an apertured portion with an elevated recess therein, a base flange projecting from the body, a plurality of depending lugs extending below said flange adapted to fit in a drain, and a deodorant cake arranged in said elevated recess and apertured in substantial alignment with the aperture in the elevated recess portion.

2. A deodorant device for drains, comprising a perforated body having an elevated portion provided with an upwardly open recess in the top thereof and means projecting downward integrally from the bottom of said body for axially locating said device over a drain.

3. A deodorant device for drains, comprising a perforated body having an elevated portion provided with an upwardly open recess in the top thereof and a plurality of radial elevating ribs built integrally with the bottom of said body.

4. A deodorant device comprising an inverted cup-shaped and laterally perforated body having an elevated portion provided with an upwardly open recess therein, a base flange projecting radially outwardly from the body, said perforations being adjacent the base flange, and locating means projecting downwardly from the inside edge of said flange.

5. A deodorant device comprising an inverted cup-shaped perforated body having an elevated apertured recess therein, a base flange projecting from said body portion and a plurality of radial elevating ribs built integrally with the under side of said base flange.

6. A deodorant device for drains comprising an inverted cup-shaped perforated body having an elevated recess in its top and an aperture through the recessed portion, a base flange projecting from the body, a plurality of depending vertical lugs integral with and extending downwardly from the body to anchor said device to a drain.

7. A deodorant container for drains comprising a hollowed and laterally perforated body having an apertured and elevated recessed portion, a base flange projecting from the body, a plurality of inward and downwardly extending lugs built integrally with the inner portion of said perforated body, the body being channeled between said lugs, and the lugs being connected with the perforations in said body.

8. A deodorant device for drains in the form of a unitary structure having an elevated cup suitable for the insertion of deodorant material therein, said cup having closed sides and a hole in the bottom thereof communicating with the bottom of said structure.

9. A deodorant device for drains in the form of a unitary structure having an elevated cup suitable for the insertion of deodorant material therein, said cup having closed sides and a hole in the bottom thereof communicating with the bottom of said structure, said structure having a hole in the side thereof communicating with the bottom of said structure.

10. A deodorant device for drains in the form of a unitary structure having an elevated cup suitable for the insertion of deodorant material therein, said cup having closed sides and in the bottom thereof elevated ribs and a hole communicating with the bottom of said structure.

11. A deodorant device for drains in the form of a unitary structure having an elevated cup suitable for the insertion of deodorant material therein, said cup having closed sides and in the bottom thereof elevated ribs and a hole communicating with the bottom of said structure, said structure having at least one hole in the side thereof communicating with the bottom of said structure.

12. A deodorant device for drains in the form of a unitary structure having an elevated cup suitable for the insertion of deodorant material therein, said cup having closed sides and a hole in the bottom thereof communicating with the bottom of said structure, said structure having a plurality of elevating ribs integral with the bottom thereof.

13. A deodorant device for drains in the form of a unitary structure having an elevated hollowed portion provided with annular upstanding walls to form a deodorant chamber having an opening upwardly spaced from the bottom thereof, at least one dimension of said opening being substantially equal to the diameter of said chamber so as to allow the insertion therethrough of a deodorant cake equal in lateral dimensions to the lateral dimensions of said chamber, said structure having a hole communicating from the bottom thereof to the bottom of said chamber.

14. A deodorant device comprising a dome shaped body provided on the top with a recess shaped for retaining deodorant material, and a plurality of peripheral fingers extending downwardly from said body.

15. A deodorant device comprising a dome shaped body shaped for retaining deodorant material, a plurality of peripheral fingers extending downwardly from said body and a flange surrounding said peripheral fingers at the lower ends thereof.

16. A deodorant device for drains including a dome shaped body having a cup shaped recess in the top thereof suitable for supporting deodorant material and having a hole extending from the bottom of said recess to the bottom of said dome member, and a plurality of fingers extending downwardly from the bottom of said dome and arranged around the periphery thereof.

17. A deodorant device for drains comprising a dome shaped body having a cavity in the bottom thereof, and having a plurality of slots each of uniform width and each extending radially between said cavity and the outer surface of said body and a radial flange encircling the lower part of said body, at least a portion of said radially extending slots intersecting the surface of said body above said flange so as to form apertures into said cavity, said body having a recess in the top thereof suitable for supporting deodorant material and having a hole communicating from said recess to said cavity.

18. A deodorant device for drains in the form of a unitary structure comprising a dome shaped body and a peripheral flange surrounding said body at the lower edge thereof, said body having a cup shaped recess in the top thereof and an inverted cup shaped cavity in the bottom thereof and having a plurality of circumferentially spaced radial slots extending outwardly from said cavity to the surface of said dome shaped body, said slots extending upwardly from the bottom of said structure to points somewhat above the top surface of said flange, said cup shaped recess having closed sides and an aperture in the bottom thereof communicating with said cavity, a deodorant cake adapted to fit into said cup shaped recess and provided with a hole adapted to register with said aperture, said flange being adapted to be placed on the bottom of a urinal so that the drain pipe of said urinal, said cavity, said hole and said aperture are all in vertical alignment.

19. A straining device for urinals in the form of a unitary structure comprising an elevated central body and a flange surrounding the same at the lower edge thereof, said central body having in the bottom thereof an inverted cup shaped cavity and a plurality of circumferentially spaced slots extending radially outwardly from said cavity to the surface of said body, said slots extending upwardly from the bottom of said structure to points somewhat above said flange and said structure having a plurality of elevating ribs integral with the bottom thereof.

20. A straining device for urinals in the form of a unitary structure comprising an elevated body, a plurality of spaced peripheral fingers extending downwardly from said body to provide spaced barriers for large floating objects and interstices therebetween for drainage of liquid and a flange surrounding and substantially tangential to said peripheral fingers at the lower ends thereof to provide a barrier for non-floating objects.

21. A holder for deodorizing and disinfecting chemical cake comprising a hollow body having an open recess in its top to receive a chemical cake and provided with an outlet passage through the bottom of the recess to permit descent of volatile currents from the cake, and water admitting openings through the sides of the body below the outlet.

22. A straining device for urinals comprising an annular flange adapted for placement over the drain of a urinal to provide a barrier for non-floating objects and having a plurality of spaced peripheral fingers in tangential relationship with the inner edge of said flange, said fingers extending upwardly from and at their lower ends being surrounded by said flange to provide spaced barriers for large floating objects and to provide a plurality of passageways between said fingers, said passageways being open at the bottom of said device and lying entirely within the inner edge of said flange to provide a free, unobstructed passage between said passageways and said drain opening.

CHAS. D. FARMER.